May 15, 1923.

R. T. KINTZING

MOTOR CONTROL SYSTEM

Filed July 30, 1920

WITNESSES:
J. P. Wurm
W. R. Coley

INVENTOR
Reese T. Kintzing
BY
Wesley G. Carr
ATTORNEY

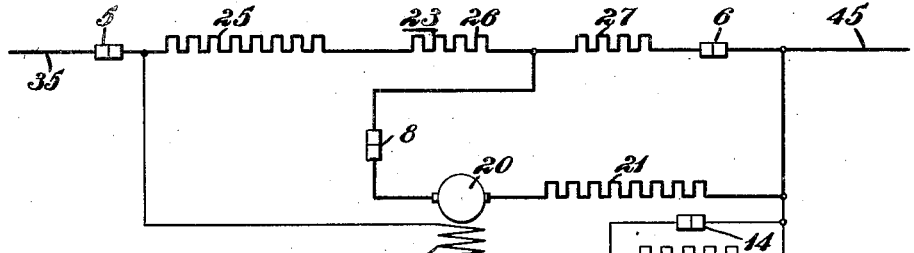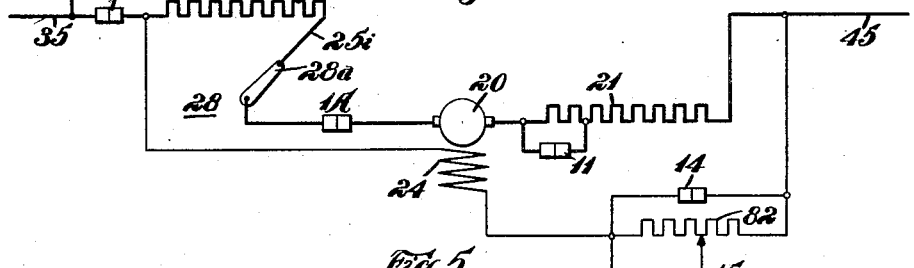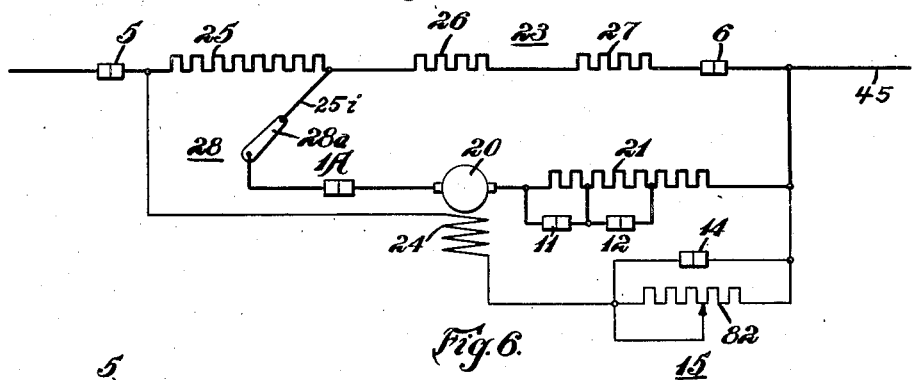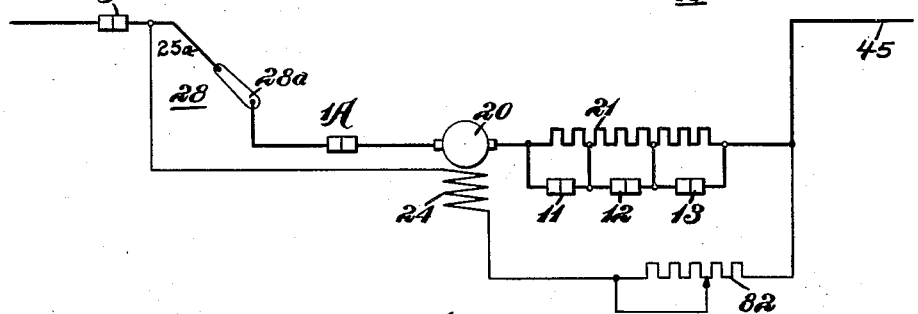

Patented May 15, 1923.

1,454,853

UNITED STATES PATENT OFFICE.

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed July 30, 1920. Serial No. 400,186.

*To all whom it may concern:*

Be it known that I, REESE T. KINTZING, a citizen of the United States, and a resident of Wilkinsburg, in the county of Allegheny and State of Pennsylvania, have invented a new and useful Improvement in Motor-Control Systems, of which the following is a specification.

My invention relates to systems of motor control and it has particular relation to systems for obtaining large starting torque for motors and for effecting relatively slight movement of machinery, such, for example, as in cloth-printing apparatus.

One object of my invention is to provide means for shunting a large portion of the resistance from an armature circuit of a motor when the motor is starting, thereby obtaining great torque and, as soon as relatively slight movement of the motor is attained, re-inserting this resistance in the armature circuit and gradually removing it as the armature speed increases.

A second object of my invention is to provide a novel motor-control system which permits of slow movement of the motor-driven machinery when it becomes necessary to make adjustments of the printing material in the rolls thereof.

A third object of my invention is to provide a control system which will effect as great a range in speed of a motor as may be desired by the operator of a machine that is driven thereby.

Briefly speaking, my invention consists in providing a circuit having relatively large resistance in shunt relation to the armature, providing a hand-operated dial switch for simultaneously changing the value of resistance in series and in shunt with the motor armature, and further providing additional means for shunting resistance during the initial starting period of the motor and for reinserting the resistance after the motor begins to run. A double-throw contactor is so arranged between the armature circuit and the shunt circuit that, by actuating it, a large portion of the resistor in the shunt circuit may be connected in series with the armature.

For a better understanding of my invention, reference may be made to the accompanying drawings, in which:

Fig. 3 is a sequence chart showing the order in which the switches that are illustrated in Figs. 1 and 2 are operated, and Figs. 4 to 7, inclusive, are diagrammatic views illustrating the main circuits as arranged in accordance with the sequence chart of Fig. 3.

Figure 1:
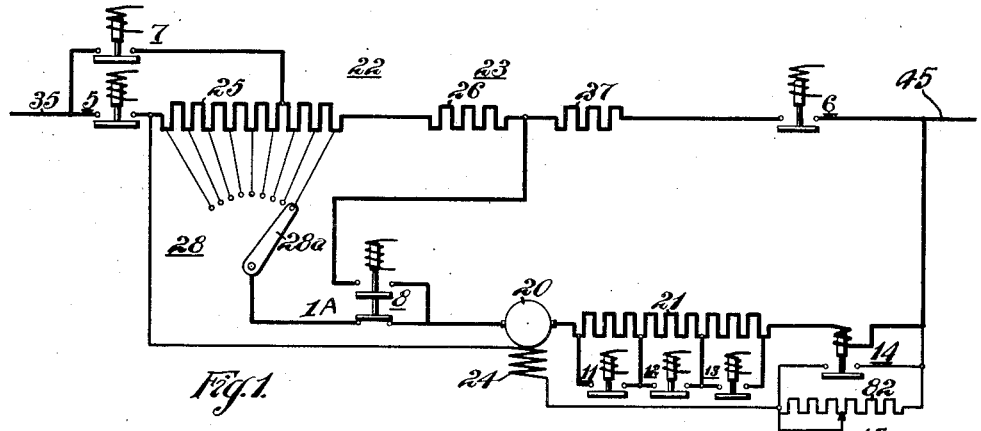
Fig. 1 is a schematic view of a motor-control system embodying my invention.
Figure 2:
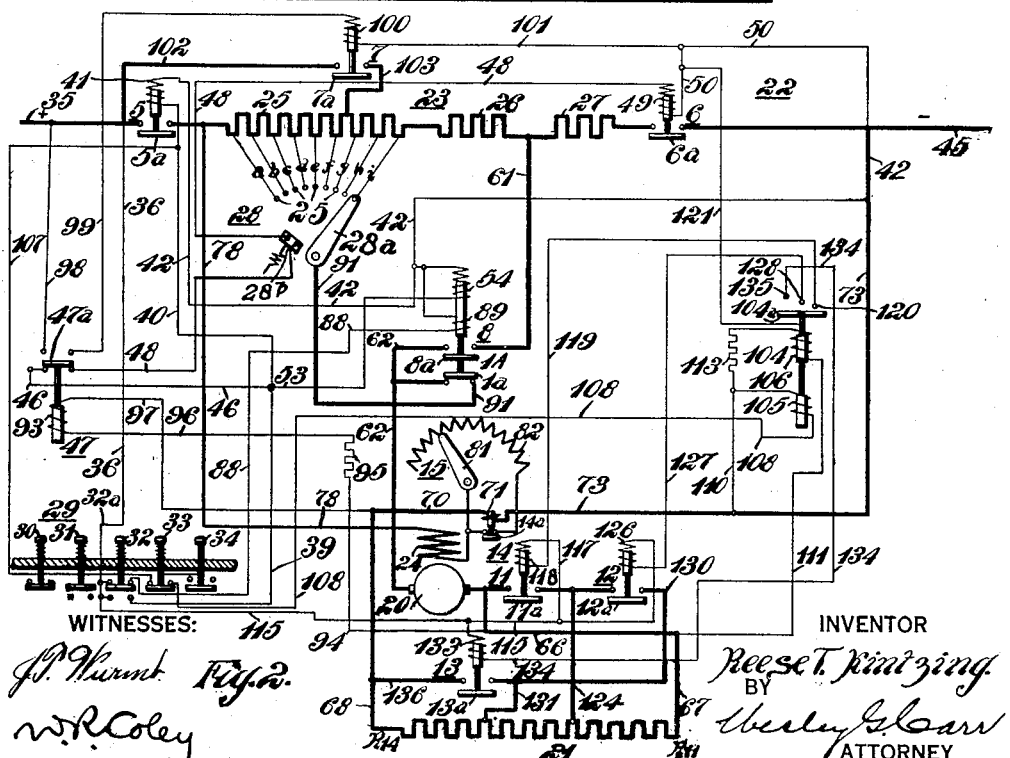
Fig. 2 is a complete diagrammatic view of the system shown in Fig. 1. For the sake of clearness, only so much of the auxiliary circuits is shown as is necessary to illustrate the particular features of my invention.

Referring to Figs. 1 and 2, a motor-control system embodying my invention comprises an armature 20, a starting resistor 21 in series therewith, a shunt circuit 22 connected to the armature circuit and having a resistor 23 therein, and a shunt field-magnet winding 24. The resistor 23 consists of resistor sections or smaller resistors 25, 26 and 27. The resistor 25 is provided with taps or conductors $25a$, $25b$, $25c$, $25d$, $25e$, $25f$, $25g$, $25h$ and $25i$ having contact terminals for shunting portions of the resistor 25. The resistor 25 and these conductors are, in actual practice, parts of a manually-operated dial switch or rheostat 28, which is employed for changing the resistance in series with the motor armature 20.

A plurality of contactors are employed for controlling the main circuits of the motor-control system. They comprise a line contactor 5, a contactor 6 in series with the resistor 25, a contactor 7 for controlling a circuit to shunt a portion of the resistor 25, a contactor 8 for connecting the resistors 25 and 26 in series with the armature 20, a contactor 1A mechanically connected to the contactor 8 in a familiar manner, for controlling the main-armature circuit, contactors 11, 12 and 13 for shunting portions of the resistor 21, and contactor 14 for shunting the field-rheostat 15.

These contactors are controlled from a push-button switchboard 29, having push-buttons 30, 31, 32, 33 and 34 mounted thereon, by means of auxiliary circuits which will be hereinafter described. The push buttons 30, 31, 32, 33 and 34 are the well-known "stop", the "start", the "jog", the "slow" and the "fast" buttons, respectively. For the sake of clearness, only those auxiliary circuits are shown which are necessary to illustrate my invention, the other auxiliary circuits being arranged in accordance with standard practice.

If an operator of a cloth-printing machine desires to have the machine run but a very short interval of time, such, for example, as when feeding a new roll of cloth into the machine, he presses the jog or inch button 32, which establishes a circuit from line conductor 35, through conductor 36, contact bridge 32a, in its lower position, conductors 39 and 40, actuating coil 41 of the line contactor 5 and conductor 42 to line conductor 45. When the circuit is completed, the actuating coil 41 is energized and the line contactor 5 is closed.

By pressing the jog button 32, a second circuit is established from the line conductor 35, through conductor 36, contact bridge 32a, conductors 39 and 46, contact bridge 47a of a relay 47, conductor 48, switch 28b, which is normally closed, actuating coil 49 of the relay 6 and conductor 50 to the line conductor 45, thereby closing contactor 6.

A third circuit is completed, by pressing jog button 32, from the line conductor 35, through conductor 36, contact bridge 32a, conductors 39 and 53, actuating coil 54 of the contactor 8 and conductor 42 to line conductor 45. The completion of this circuit causes the actuating coil 54 to close the contactor 8.

By closing contactors 5, 6 and 8, a series armature circuit, a shunt circuit 22 around the armature, and a shunt field-magnet-winding circuit are established. (See Fig. 4 of the drawings.) The armature circuit extends from the line conductor 35, through contact bridge 5a, resistors 25, and 26, conductors 61, contact bridge 8a, conductor 62, armature 20, conductors 66 and 67, starting resistor 21, conductors 68 and 70, actuating coil 71 of the switch 14 and conductors 73 and 42, to line conductor 45.

The parallel circuit 22 extends from line conductor 35, through contact bridge 5a, resistors 25, 26 and 27, and contact bridge 6a to line conductor 45.

The shunt field-magnet winding 24 is energized through a circuit extending from line conductor 35, through contact bridge 5a, conductor 78, shunt field-magnet winding 24, rheostat arm 81, resistance element 82 and conductors 73 and 42, to line conductor 45.

The first rush of current through the armature circuit will energize the actuating coil 71 of the contactor 14, which controls the circuit for shunting the field rheostat, by contact bridge 14a, thereby permitting a stronger magnetic field for the motor.

No current will traverse the hand dial switch 28, since the contactor 1A was opened when the contactor 8 closed. Therefore, the current traversing the motor armature 20 will be limited by reason of the employment of the resistors 25 and 26 and the starting resistor 21. The shunt circuit, comprising the resistor 27 and the contactor 6, also limits the applied armature voltage and correspondingly decreases the current traversing the armature 20.

It is apparent from the above description that the effect of pressing the jog button 32 is to energize fully the field-magnet winding 24 and to pass a limited current through the armature circuit. The effect of these conditions is to start the motor at a low speed, with relatively great torque.

The contactors 5, 6, 8 and 14 open as soon as the jog button 32 is released, thereby de-energizing all circuits and stopping the motor. The actuating coil 54 for the contactor 8 may be energized only by pressing the jog button 32; under all other conditions the contractor 8 is open and the contactor 1A is closed.

When the jog button is in its normal or upper position, a circuit is established from the line conductor 35, through conductor 36, contact bridge 32a, conductor 88, holding coil 89 for the contactors 1A and 8 and conductor 42 to line conductor 45. This holding coil 89 is energized as long as a line switch (not shown) for the line conductors 35 and 45 is closed.

The motor is started by pressing the start button 31. This action establishes a circuit (not shown, as it may be arranged in any well known manner) through the actuating coil 41, thereby closing the contactor 5. The closing of the contactor 5 establishes a circuit from the line conductor 35, through contact bridge 5a, resistor 25, conductor 25i, manually operated arm 28a, conductor 91, contact bridge 1a, conductor 62, armature 20, conductors 66 and 67, starting resistor 21, conductors 68 and 70, actuating coil 71 and conductors 73 and 42, to line conductor 45 (see Fig. 5 of the drawings).

The actuating coil 93 of the relay 47 is so energized by the difference in potential at the ends of the starting resistor 21 that contact bridge 47a is actuated from its lower to its upper position. The bridge 47a is maintained in that position for a few seconds until the growing counter E. M. F. of the motor sufficiently decreases the energization of the coil 93 to cause the relay 47 to assume its lower position. The circuit for energizing the actuating coil 93 extends from conductor 66 at one end of the resistor 21 through conductor 94, resistor 95, conductor 96, actuating coil 93, conductor 97 to conductor 70 at the other end of the resistor 21.

When the relay 47 is actuated from its lower position, the circuit, comprising contact bridge 47a, conductor 48 and actuating coil 49, is broken, and the contactor 6 opens. When the relay 47 assumes its upper position, a circuit is established from the line conductor 35, through conductor 98, contact bridge 47a, conductor 99, actuating coil 100 of the contactor 7 and conductors 101 and 50, to line conductor 45, thereby closing the contactor 7.

The contactors 6 and 8 being open and the contactor 7 being closed, an armature circuit is established from the line conductor 35, through conductor 102, contact bridge 7a, conductor 103, a relatively small portion of resistor 25, conductor 25i, arm 28a, conductor 91, contact bridge 1a of the contactor 8, conductor 62, armature 20, conductors 66 and 67, starting resistor 21, conductors 68 and 70, actuating coil 71 of the switch 14 and conductors 73 and 42 to line conductor 45 (see Fig. 5 of the drawings).

The contactor 14 is closed by the heavy rush of current in the series coil 71, thereby shunting the field rheostat 15. The shunt field-magnet winding 24 is fully energized by the field rheostat 15 being shunted and, since the armature circuit is traversed by a relatively large starting current, because of a relatively large portion of the resistor 25 being shunted and the parallel circuit 22 being de-energized by contactors 6 and 8 being open, a large starting torque is produced by the motor 1.

After the voltage across the resistor 21 has decreased sufficiently to safely permit closure of the contactor 11, the contact bridge 47a opens and breaks the circuit comprising actuating coil 100 of the contactor 7. The contactor 7 is thus caused to open, thereby breaking the shunt circuit across part of the resistor 25, and the resistor 25 is thus connected in series relation with the armature 20. The motor is subjected to the initial rush of current only during the interval of the time that the relay 47 is in its upper position. When the relay 47 returns to its lower position, contactor 6 is closed, thereby establishing the shunt circuit 22 around the armature 20 and the starting resistor 21 (see Fig. 6 of the drawings).

The starting resistor 21, which is in series with the motor armature 20, is shunted by the closure of contactors 11, 12 and 13. These contactors are controlled by a relay 104, which is adapted to effect the closure of the contactors 11, 12 and 13 as the counter E. M. F. of the motor 20 increases. The relay 104 may be of the DeCamp type, which is fully described in copending applications of Ray E. DeCamp, filed June 21, 1918 and November 11, 1919, bearing Serial Nos. 241,259 and 337,175, respectively, and assigned to the Westinghouse Electric & Manufacturing Company.

The relay 104 is provided with actuating coils 105 and 106 (see Fig. 2 of the drawings). The coil 105 is energized when a circuit is established from the conductor 40, which is energized by means of the start button 31, through conductor 107, contact bridge 33a of the slow push button 33, conductor 108, actuating coil 105 of the relay 104, and conductors 110, 73 and 42, to line conductor 45. The circuit of coil 106 comprises conductor 66, at the armature end of the starting resistor 21, conductor 111, actuating coil 106, resistor 113, conductors 110 and 73 and the starting resistor 21.

When the actuating coil 106 is sufficiently de-energized, on account of the decreased potential drop across the starting resistor 21, to permit the contact bridge 104a to assume its first closed position, a circuit is established from the line conductor 35, through conductors 36, 115 and 117, actuating coil 118 of the contactor 11, conductor 119, contact terminal 120, contact bridge 104a and conductors 121 and 50, to line conductor 45.

When the contactor 11 is closed by the actuating coil 118 being energized, a portion of the starting resistor 21 is shunted by a circuit established from conductor 66, through contact disk 11a and conductor 124, to the starting resistor 21.

A second portion of the starting resistor 21 is shunted when the relay 104 assumes its second closed position, because of the coil 106 being still further de-energized. The contactor 12 is closed by a circuit being established from the line conductor 35 through conductors 36 and 115, actuating coil 126 of the contactor 12, conductor 127, contact terminal 128, contact bridge 104a and conductors 121 and 50, to line conductor 45.

When the contactor 12 is closed, a shunt circuit is established from the conductor 66, through contact bridges 11a and 12a, and conductors 130 and 131, to the starting resistor 21.

When the relay 104 occupies its third closed position, a circuit is established from the line conductor 35, through conductors 36 and 115, actuating coil 133 of the contactor 13, conductor 134, contact terminal 135, contact bridge 104a and conductors 121 and 50, to line conductor 45, thereby closing the contactor 13. The starting resistor 21 is completely shunted, when the contactor 13 is closed, by a circuit from conductor 66, through contact bridges 11a and 12a, conductor 130, contact bridge 13a and conductor 136, to conductor 68 (see Fig. 7 of the drawings).

The speed of the motor may be increased by so actuating the arm 28a of the hand-operated dial switch 28 that the resistor 25 is gradually removed from the armature circuit, until the armature 20 is connected directly across the line conductors 35 and 45.

When the arm 28a of the rheostat 28 occupies position a, the switch 28b is open, thereby de-energizing the actuating coil 49 of switch 6.

The speed of the motor may also be adjusted by varying the active resistance of the field rheostat 15, after the actuating coil 71 is sufficiently de-energized to open the contactor 14, thereby breaking the shunt circuit around the field rheostat 15. (See Fig. 7 of the drawings.)

The steps in starting the motor may thus be summarized, as, first, connecting two starting resistors in series with a motor armature; second, shunting a large portion of one of the resistors; third, after the motor has started to run, reinserting the portion of the resistor that is shunted; fourth, establishing a circuit parallel to the motor armature; fifth, shunting one of the resistors by contactors controlled by the counter E. M. F. generated by the motor and, lastly, shunting the other resistor by means of a manually-controlled dial switch.

It is apparent from the above description that a motor controlled by a system constructed in accordance with my invention will have a great range of speed and power, thereby permitting the rolls of the printing machine which it operates to turn very slowly, when adjusting the printing material, and very fast, when full running speed is desired.

While I have shown my invention in a preferred form, various modifications in the apparatus and control circuits may be made without departing from the spirit thereof. I desire, therefore, to be limited only by the scope of the appended claims.

I claim as my invention:

1. The combination with a motor armature and a resistor in shunt relation thereto, of means for gradually connecting said armature in series relation with a portion of said resistor and means comprising a switch for rendering said means inoperative and for connecting a different portion of said resistor in series relation with said armature.

2. The combination with a motor armature and a circuit in parallel relation thereto, of a resistor in said parallel circuit, means comprising a rheostatic device for gradually connecting a portion of said resistor in said armature circuit and means for rendering said means inoperative and for connecting a larger portion of said resistor in series relation with said armature.

3. The combination with a motor armature and a starting resistor in series therewith, of a second circuit in parallel relation to said armature and said resistor, a second resistor in series with said second circuit, and means for connecting a portion of said second resistor in series with said motor armature.

4. The combination with a motor armature, of a shunt circuit around said armature and provided with a resistor, means for connecting a portion of said resistor in series with said armature, and means for connecting an additional portion of said resistor in series with said armature.

5. The combination with a circuit comprising a motor armature, of a second circuit in parallel relation to said armature circuit and comprising a resistor, means for connecting a portion of said resistor in series with said armature, and a contactor for disconnecting said portion of said resistor from said armature circuit and for connecting a larger portion of said resistor in series with said armature.

6. The combination with a circuit comprising a motor armature, of a second circuit in parallel relation to said armature circuit and comprising a resistor, manually operable means for connecting portions of said resistor in series with said armature circuit and a contactor for connecting a larger portion of said resistor, including said portions controlled by said manually operable means, in series with said armature circuit.

7. The combination with a dynamo-electric machine and a resistor electrically connected thereto, of means actively responsive to the starting operation of said dynamo-electric machine for shunting a portion of said resistor and for reconnecting said portion of said resistor to said machine prior to the attainment thereby of a predetermined speed.

8. The combination with a motor having an armature and a resistor connected in series therewith, of means controlled by said dynamo-electric machine for shunting a portion of said resistor when starting said machine and for reconnecting said portion of said resistor in series with said motor prior to the attainment thereby of full speed.

9. The combination with a motor having an armature, a starting resistor in series with said armature and an additional resistor in series with said armature, of means for effecting the starting of said motor, of means independent of said starting means for shunting said additional resistor at the instant of starting said motor and reconnecting said additional resistor in series with said armature prior to the attainment of a predetermined speed by said motor.

10. The combination with a motor having an armature, a starting resistor in series with said armature and an additional resistor in series therewith, of means controlled by said starting resistor for shunting a portion of said additional resistor when first starting said motor and for reconnecting said portion of said additional resistor in series with said motor prior to the attainment of full speed by said motor.

11. The combination with a motor having an armature, a starting resistor in series with said armature, and an additional resistor in series therewith, of a shunt circuit for shunting a portion of said additional resistor, a contactor for opening and closing said shunt circuit, and a relay controlled by said starting resistor for closing said contactor during the initial stage of starting said motor.

12. The combination with a motor having an armature, a starting resistor in series with said armature and an additional resistor in a circuit in parallel relation thereto, of means for connecting a portion of said second resistor in series with said armature, means controlled by said starting resistor for shunting a portion of said additional resistor from said armature circuit during the starting of said motor, and means controlled by said starting resistor for disconnecting said additional resistor from said parallel circuit.

13. The combination with a motor having an armature, a starting resistor connected in series with said armature, and a parallel circuit connected across said armature and said starting resistor, of an additional resistor connected in series with said parallel circuit, means for connecting a portion of said additional resistor in series with said armature, a contactor for shunting a portion of said additional resistor during the starting of said motor, a second contactor for opening and closing said parallel circuit, and a relay controlled by said starting resistor for closing said first contactor and opening said second contactor when starting said motor.

14. The combination with a dynamo-electric machine and a resistor electrically connected thereto, of automatic means for shunting a portion of said resistor in starting said machine and for reconnecting said portion of said resistor to said machine prior to its attaining full speed.

15. The combination with a dynamo-electric machine and a resistor electrically connected thereto, of automatic means for shunting a portion of said resistor in starting said machine and for reconnecting said portion to said machine prior to its attaining full speed, and means independent of said first means for subsequently shunting said portion of resistor.

In testimony whereof, I have hereunto subscribed my name this 26th day of July 1920.

REESE T. KINTZING.